(12) United States Patent
Kang et al.

(10) Patent No.: US 7,386,092 B2
(45) Date of Patent: Jun. 10, 2008

(54) CONTAINERS/VEHICLE INSPECTION SYSTEM WITH ADJUSTABLE RADIATION X-RAY ANGLE

(75) Inventors: Kejun Kang, Beijing (CN); Jianmin Li, Beijing (CN); Zhiqiang Chen, Beijing (CN); Shangmin Sun, Beijing (CN); Yucheng Wu, Beijing (CN); Wanquan Shen, Beijing (CN); Hongliang Yang, Beijing (CN); Jianxin Wang, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 0 days.

(21) Appl. No.: 10/575,667

(22) PCT Filed: Sep. 22, 2004

(86) PCT No.: PCT/CN2004/001076

§ 371 (c)(1),
(2), (4) Date: Dec. 4, 2006

(87) PCT Pub. No.: WO2005/043144

PCT Pub. Date: May 12, 2005

(65) Prior Publication Data

US 2007/0133740 A1    Jun. 14, 2007

(30) Foreign Application Priority Data

Oct. 16, 2003   (CN) .................. 2003101001821

(51) Int. Cl.
*G01N 23/063* (2006.01)

(52) U.S. Cl. ........................................ 378/57; 387/197

(58) Field of Classification Search .................. 378/57, 378/196, 197, 198, 203
See application file for complete search history.

(56) References Cited

U.S. PATENT DOCUMENTS 4,841,554 A    6/1989   Doenges et al. ............... 378/57

(Continued)

FOREIGN PATENT DOCUMENTS

CN           1490615        4/2004

(Continued)

*Primary Examiner*—Hoon Song
(74) *Attorney, Agent, or Firm*—Westman, Champlin & Kelly, P.A.

(57) ABSTRACT

A containers/vehicles inspection system with adjustable radiation X-ray angle relates to the technical field of radiation inspection. The present invention comprises a detector arm rack equipped with detectors, a second collimator, a pulling device, and an accelerator rack with the accelerator. X-ray produced by the accelerator is right opposite to the calibrator, the first collimator and the second collimator all of which are arranged in order, wherein, said accelerator rack is further composed of a horizontal regulation mechanism for moving the base forward and afterward horizontally, a vertical regulation mechanism for moving the bending framework up and down vertically, a rotary regulation mechanism for rotating the cantilever, a pitching regulation mechanism for driving the accelerator to make pinching movement, as well as a framework formed by a base, a vertical arm, a bending framework and a cantilever. Compared with the prior arts, the present invention is advantageous in reasonable structural design, convenient use and high imaging quality, especially satisfactory effect of focused inspection to some suspicious areas. So it is the necessary equipment for inspecting the Customs goods.

10 Claims, 2 Drawing Sheets

U.S. PATENT DOCUMENTS

| | | |
|---|---|---|
| 6,252,929 B1 | 6/2001 | Swift et al. .................. 378/57 |
| 7,082,186 B2 * | 7/2006 | Zhao et al. .................. 378/57 |
| 7,133,491 B2 * | 11/2006 | Bernardi et al. ............. 378/57 |
| 7,207,713 B2 * | 4/2007 | Lowman .................... 378/198 |
| 2006/0203962 A1 * | 9/2006 | Hu et al. ..................... 378/57 |

FOREIGN PATENT DOCUMENTS

JP        8166359        6/1996

* cited by examiner

CONTAINERS/VEHICLE INSPECTION SYSTEM WITH ADJUSTABLE RADIATION X-RAY ANGLE

CROSS-REFERENCE TO RELATED APPLICATION

This Application is a Section 371 National Stage Application of International Application No. PCT/CN2004/001076, filed Sep. 22, 2004 and published as WO 2005/043144 on May 12, 2005, not in English, the content of which is hereby incorporated by reference in its entirety

FIELD OF THE INVENTION

The present invention relates to the radiation inspection technology field, especially to a fixed or combined movable container inspection system for inspecting large-sized container trucks in the Customs and harbors.

BACKGROUND OF THE INVENTION

The container/vehicles inspection system is one of the inspection equipment urgently necessary in the Customs and harbors. At present, the containers in the harbors at home and abroad have been checked through the unpacking inspection or by obtaining images through radiation, with long unpacking and inspection, low daily inspection quantity and high inspection cost. For obtaining images through the radiation, the large scale container/vehicle inspection system with the accelerator or Cobalt 60 as radiation source has been developed and manufactured at home and abroad, such as the large scale container/vehicle inspection systems manufactured by Haiman Corporation, Germany and British Airspace Corporation. The above inspection systems are devised as follows. A radiation source which is stationary and produces high energy x-ray and array detectors which receive x-ray passing through the container are mounted in an inspection passage which is capable of shielding radiation beams. A vehicle carrying the container is pulled by a special pulling device so as to pass by the inspection passage. When the container passes the container while the x-ray beams are radiated thereon, the x-ray has transmitted through the container incident on the detectors. As a result, the density distribution of the objects contained in the container is presented according to the variation of the intensity of the x-ray. Then, the intensity of the x-ray is converted into a corresponding gray degree of an image so that a perspective view of the objects contained in the container can be obtained. In such imaging system, the radiation source is fixed, and it is difficult to meet inspection requirements of the container trucks with different height because the height of the container trucks to be inspected varies randomly and the stationary radiation source cannot take any suspicious area as the imaging emphasis; although the computer can amplify and highlight any suspicious area of the image during the imaging, it is difficult for the amplified image to help the inspectors to make correct judgment as the target point cannot aim at the suspicious area. Therefore, existing container/vehicle inspection systems with stationary radiation source cannot fulfill the task for some suspicious articles or goods. In present technology, there is a kind of container inspection system which is of the movable one. This system has a relatively complex pulling device that can pull radiation source, detector and collimator, etc., to reciprocate along the tracks. But such simplex movement results in large moving distance of radiation source when the target point of radiation source aims at the bottom of the container, and thus increasing the land occupation area of whole system. In one word, the existing container inspection system above-mentioned has such disadvantages as large land occupation area of the project and difficulty to make focused inspection to the suspicious area.

SUMMARY OF THE INVENTION

The present invention has been made to overcome the above mentioned disadvantages and provide a containers/vehicles inspection system with adjustable radiation X-ray angle, which has small land occupation area and can make focused inspection to the suspicious area. This system can not only be used for security inspection of the Customs goods, but also for smuggling suppression of their entry and exit.

The technical scheme of the present invention is achieved as follows in order to reach above invention purposes:

According to the present invention, there is provided a containers/vehicles inspection system with adjustable radiation X-ray angle, comprising: an inspection passage; a pulling vehicle for carrying the containers/vehicles to be inspected to pass through said inspection passage; an accelerator for emitting X-ray; and an accelerator rack for bearing said accelerator. Said an accelerator rack is composed of a rack including a base, a vertical arm vertically connected to the base, a bending framework vertically connected to said vertical arm, and a cantilever connected under said bending framework; a rotary adjustment mechanism arranged between the horizontal end of said bending framework and said cantilever so as to make said cantilever rotate horizontally; and a pitching adjustment mechanism provided at the bottom end of said cantilever; said accelerator is hinged with the pitching adjustment mechanism at the coaxial intersection of the cantilever and the pitching adjustment mechanism through a hinging shaft and provided over the base so as to make vertical pitching movements.

According to above technical scheme, said accelerator rack further comprises the horizontal regulation mechanism, which is connected to said base, for moving the base forward and afterward horizontally. The horizontal regulation mechanism is composed of a horizontal guide rail; a fifth driving device mounted at the bottom end of said base; a fifth screw mounted in said base and connected to a rotary shaft of the fifth driving device; and a fifth nut base, which is installed in said horizontal guide rail and threadedly connected with said fifth screw so as to through the thread set, make said base move forward and afterward along said horizontal guide rail.

According to above technical scheme, said accelerator rack further comprises a vertical regulation mechanism, which is provided in the vertical arm, for moving the bending framework up and down vertically. The vertical regulation mechanism is composed of a vertical guide rail; a fourth driving device connected to a pinion; a gearwheel for engaging with the pinion so as to form a reducer, both of which are installed on the upper top surface of said vertical arm; a fourth screw provided in said vertical arm and connected to a driving shaft of the gearwheel; and a fourth nut base, which is provided in the side arm of said bending framework and threadedly connected with the fourth screw so as to through the thread set, make said bending framework move up and down along said vertical guide rail.

According to above technical scheme, said rotary regulation mechanism is composed of a third driving device provided on a horizontal end of said bending framework; a gear provided on the driving shaft of said third driving device; and a rotary support, of which a inner tooth ring engages with said gear and is connected to said cantilever, and a outer ring of which is connected to the lower end surface of said bending framework; thus said cantilever can be rotated through the inner tooth ring of said rotary support engaging with the gear.

According to above technical scheme, said pitching regulation mechanism comprises a second driving device; a worm connected to said second driving device; a worm wheel engaged with said worm; and an accelerator support rack connected with a rotary shaft of said worm wheel, on which the second driving device is provided, for realizing the change in sector elevation angle of main X-ray beam produced by said accelerator through the worm and worm wheel set.

According to above technical scheme, a detector arm rack equipped with detectors and the second collimator is provided in said inspection passage; the X-ray produced by the accelerator is right opposite to the calibrator and the first collimator both which are arranged in order, and said first collimator is right opposite to said second collimator, so that the conical X-ray produced by said accelerator, after regulated into a sector shape, passes through the articles to be inspected and then is received by the detectors in the detector arm rack.

According to above technical scheme, said detector arm rack is in the mode of a bending beam or a combination mode of horizontal beam with vertical beam.

The present invention, due to above structure, i.e., only an accelerator rack installed for the accelerator, produces positive use effect during its use. It can regulate the accelerator rack according to the special inspection demands of some goods so as to regulate in will the X-ray angle of the accelerator within a wide scope conveniently. Compared with existing technology, the present invention is featured by reasonable structural design, convenient use and high imaging quality, especially satisfactory effect of focused inspection to some suspicious areas. So it is the necessary equipment for inspecting the Customs goods.

DETAILED DESCRIPTION OF THE PREFERRED EMBODIMENT

Now, the present invention is further described combined with attached drawings and the preferred embodiments.

Figure 1:
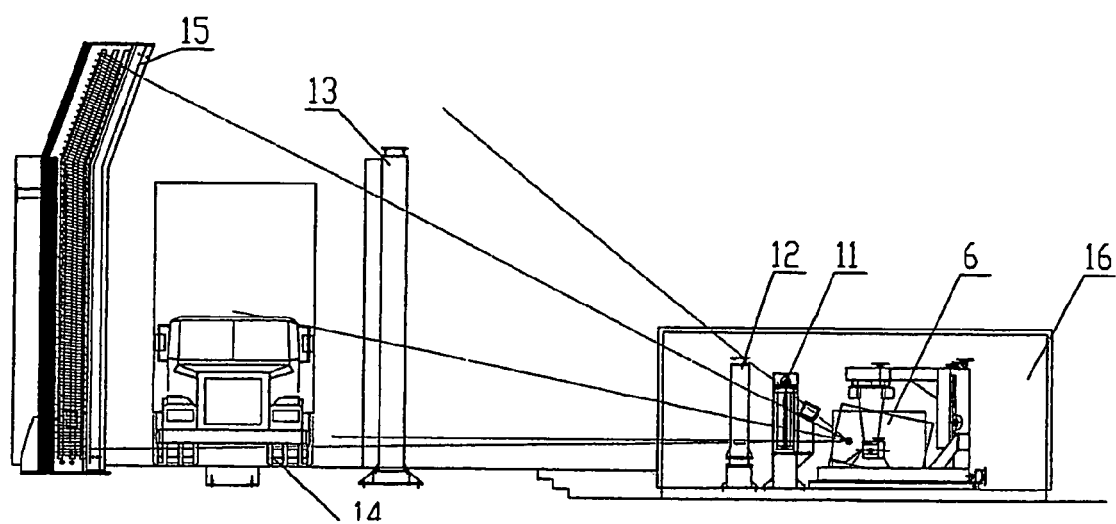
FIG. 1 is a structural view of a containers/vehicles inspection system with adjustable radiation X-ray angle according to an embodiment of the present invention.
Figure 2:
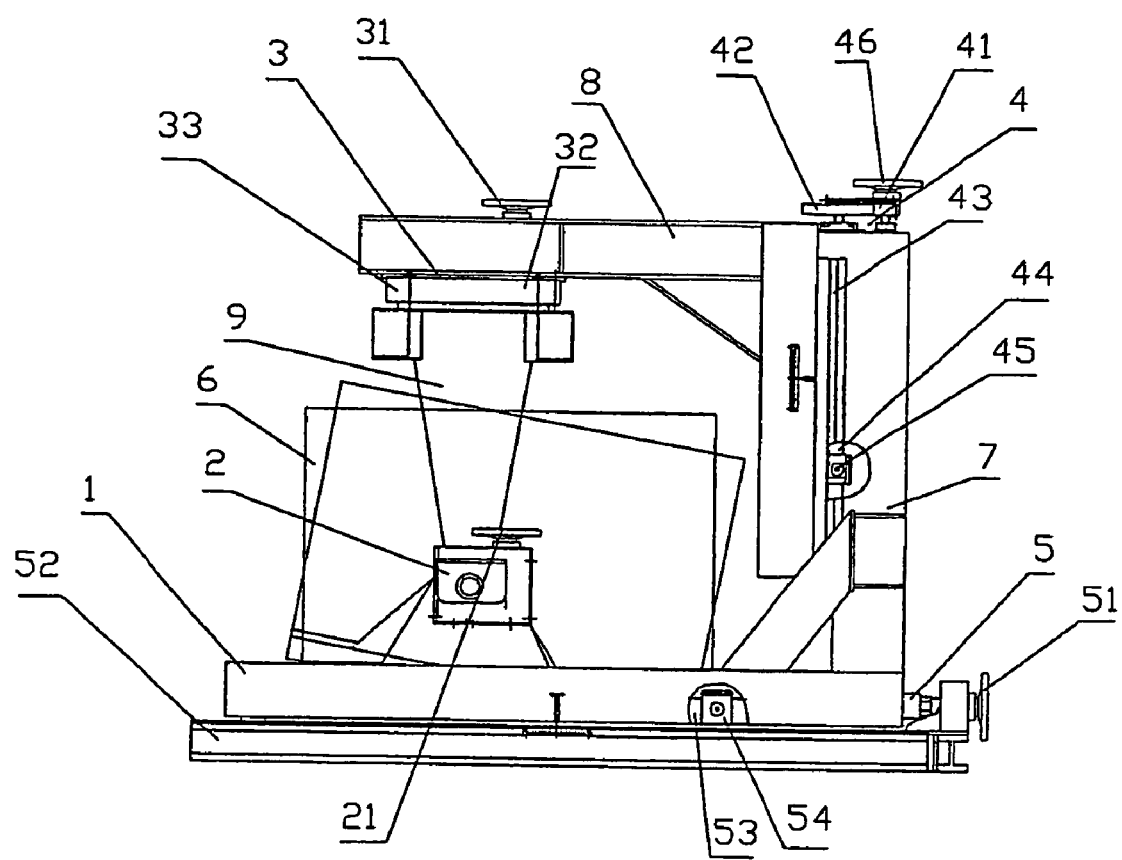
FIG. 2 is a structural view of an accelerator according to an embodiment of the present invention.

As shown in FIG. 1 and FIG. 2, the inspection system according to the present invention is composed of a detector arm rack 15 which is installed in a inspection passage and equipped with a detector and is formed of a bending beam or a combination of a horizontal beam and a vertical beam, a second collimator 13, a pulling vehicle 14 for carrying containers/vehicles to be inspected to pass through the inspection passage, and an accelerator rack equipped with a accelerator 6. X-ray produced by the accelerator 6 is right opposite to a calibrator 11 and a first collimator 12 both which are arranged in order. The first collimator 12 is right opposite to the second collimator 13 so that the conical X-ray produced by the accelerator 6, after regulated into a sector, passes through articles to be inspected and then is received by the detectors in the detector arm rack 15.

The accelerator rack is composed of a horizontal regulation mechanism 5, a vertical regulation mechanism 4, a rotary regulation mechanism 3, a pitching regulation mechanism 2, and a framework composed of a base 1, a vertical arm 7, a bending framework 8 and a cantilever 9. The horizontal regulation mechanism 5 which is connected to the base 1 is composed of a horizontal guide rail 52, a fifth handwheel 51, a fifth screw 53 and a fifth nut base 54. The fifth handwheel 51 is installed at the side end of the base 1, a rotary shaft of the fifth handwheel 51 is connected to a fifth screw 53 installed in the base 1, the fifth screw 53 is threadedly connected to the fifth nut base 54 installed in the horizontal guide rail 52 so as to through such thread set, make the base 1 move forward and afterward along the horizontal guide rail 52.

The vertical regulation mechanism 4 which is installed in the vertical arm 7 connected vertically to the base 1 is composed of a vertical guide rail 43, a fourth handwheel 46, a pinion 41, a gearwheel 42, a fourth screw 44 and a fourth nut base 45. The fourth handwheel 46 is connected to the pinion 41, the pinion 41 is engaged with the gearwheel 42 so as to form a reducer which is installed on the horizontal surface of the vertical arm 7, the driving shaft of the gearwheel 42 is connected with the fourth screw 44 mounted in the vertical arm 7, the fourth screw 44 is threadedly connected to the fourth nut base 45 mounted in the side arm of the bending framework 8 so as to through the thread set, make the bending framework 8 move up and down along the vertical guide rail 43.

The rotary regulation mechanism 3 provided between the horizontal end of the bending framework 8 and the cantilever 9 connected below the bending framework 8 is composed of a third handwheel 31, a gear 32 and a rotary support 33. The third handwheel 31 is installed on the bending framework 8, the gear 32 installed on the driving shaft of the third handwheel 31 engaged with the inner tooth ring of the rotary support 33, the inner ring of the rotary support 33 is connected to the cantilever 9, the outer ring of the rotary support 33 is connected to the lower end surface of the bending framework 8, and said cantilever 9 can be rotated through the inner tooth ring of the rotary support 33.

Said pitching regulation mechanism 2 installed at the bottom end of the cantilever 9 is composed of a second handwheel 21, a worm wheel, a worm and an accelerator support rack. The second handwheel 21 is installed on the accelerator support rack and connected to the worm which is engaged with the worm wheel. The rotary shaft of the worm wheel is coupled to the accelerator support rack, the accelerator 6 is hinged at the coaxial intersection of the cantilever 9 and the pitching adjustment mechanism 2 through a hinging shaft, and the accelerator 6 can realize the change in its sector elevation angle of the main X-ray beams through the worm and worm wheel set.

During the use, the action control of the inspection system according to the present invention is first to be powered to devices thereof for their startup. When the indexes are normal, the operator will implement remote control to carry the container truck on the pulling device 14 anchored at the inlet of the inspection passage and to block the front wheels of the container truck. The winch of the pulling device 14 is started and controlled so that the pulling device 14 is advanced by the wire rope and carries the container truck to drive smoothly into the inspection passage. When the container truck enters the inspection passage, the X-ray beams produced by the accelerator 6 will carry out inspection; the first collimator 12 will regulate and convert the conical X-ray produced the accelerator 6 into the sector beams vertical to the ground; the sector beams pass through the container truck and are received by the detector in the detector arm rack 15, and then convert the image signals into the electronic signals and input them into the image obtaining module mounted outside the inspection passage; the image obtaining module transmits the image signals to the operation detector for displaying images. In order to make the target point of the X-ray produced by the accelerator 6 aims at the suspicious area in the container truck to be inspected, the accelerator rack can be used for regulating location and angle of the accelerator 6 if necessary.

The fifth handwheel 51 in the horizontal regulation mechanism 5 is rotated to drive the fifth screw 53 connected in its central shaft to rotate; the base 1 is moved forward and backward along the horizontal guide rail 52 under the base 1 through the threaded engagement of the fifth nut base 54 and the fifth screw 53 mounted on inner chamber wall of the base 1, so as to regulate properly the horizontal distance between the accelerator 6 and the area to be inspected. The fourth handwheel 46 in the vertical regulation mechanism 4 is rotated to drive the pinion 41 to rotate which transfers the rotary movement to the gearwheel 42 so as to make the fourth screw 44 connected to the gearwheel 42 rotate; the fourth screw 44 drives the fourth nut base 45 installed in the side arm of the bending framework 8 to move so as to drive the bending framework 8 to move up or down along the vertical guide rail 43 of the vertical arm 7. The third handwheel 31 of the rotary regulation mechanism 3 is driven to rotate the gear 32 via the interaction mechanism so as to make the cantilever 9 connected to the rotary support 33, together with the accelerator 6 below the rotary support 33, horizontally rotate around the vertical axis of the cantilever, until the X-ray plane aims at the area to be inspected. The second handwheel 21 in the pitching regulation mechanism 2 drives the worm under an axes of the second handwheel 21 to rotate; the worm engages with the worm wheel that is vertically placed so as to drive the worm wheel and the accelerator 6 which is connected to the worm wheel through the support rack to rotate on the vertical surface along the central axis of the worm wheel; the elevation angle of main X-ray beams produced by the accelerator 6 is changed. After regulation steps above-mentioned, aiming the target point of the X-ray produced by the accelerator 6 at the suspicious area in the container truck to be inspected is performed to obtain clear image of that location.

After completion of the inspection, the accelerator 6 will stop radiation, and the pulling device 14 will carry the container truck to drive out of the inspection passage. When the pulling device 14 arrives at the outlet of the inspection passage and is anchored, the container truck will be unloaded from the pulling device 14; thus, the inspection system according to the present invention completes an inspection procedure.

Although a preferred embodiment has been described, it would be appreciated by those skilled in the art that the present invention may be made in any other mode without departing from the principles and spirit of the invention.

The invention claimed is:

1. A containers/vehicles inspection system with adjustable radiation X-ray angle, comprising:
   an inspection passage;
   a pulling vehicle for carrying the containers/vehicles to be inspected to pass through said inspection passage;
   an accelerator for emitting X-ray; and
   an accelerator rack for bearing said accelerator;
   wherein said accelerator rack is composed of a rack including
      a base;
      a vertical arm vertically connected to the base;
      a bending framework vertically connected to said vertical arm; and
      a cantilever connected under said bending framework;
   a rotary adjustment mechanism arranged between the horizontal end of said bending framework and said cantilever so as to make said cantilever rotate horizontally; and
   a pitching adjustment mechanism provided at the bottom end of said cantilever; said accelerator is hinged with the pitching adjustment mechanism at the coaxial intersection of the cantilever and the pitching adjustment mechanism through a hinging shaft and provided over the base so as to make vertical pitching movements.

2. The containers/vehicles inspection system with adjustable radiation X-ray angle according to claim 1, wherein, said accelerator rack further comprises the horizontal regulation mechanism, which is connected to said base, for moving the base forward and afterward horizontally.

3. The containers/vehicles inspection system with adjustable radiation X-ray angle according to claim 2, wherein, said horizontal regulation mechanism is composed of:
   a horizontal guide rail;
   a fifth driving device mounted at the bottom end of said base;
   a fifth screw mounted in said base and connected to a rotary shaft of the fifth driving device; and
   a fifth nut base (54), which is installed in said horizontal guide rail and threadedly connected with said fifth screw so as to through the thread set, make said base move forward and afterward along said horizontal guide rail.

4. The containers/vehicles inspection system with adjustable radiation X-ray angle according to any one of claim 1, wherein, said accelerator rack further comprises a vertical regulation mechanism, which is provided in the vertical arm, for moving the bending framework up and down vertically.

5. The containers/vehicles inspection system with adjustable radiation X-ray angle according to claim 4, wherein, said vertical regulation mechanism is composed of:
   a vertical guide rail;
   a fourth driving device connected to a pinion;
   a gearwheel for engaging with the pinion so as to form a reducer, both of which are installed on the upper top surface of said vertical arm;
   a fourth screw provided in said vertical arm and connected to a driving shaft of the gearwheel; and
   a fourth nut base, which is provided in the side arm of said bending framework and threadedly connected with the fourth screw so as to through the thread set, make said bending framework move up and down along said vertical guide rail.

6. The containers/vehicles inspection system with adjustable radiation X-ray angle according to claim 1, wherein, said rotary regulation mechanism is composed of:
   a third driving device provided on a horizontal end of said bending framework;
   a gear provided on the driving shaft of said third driving device; and
   a rotary support, of which an inner tooth ring engages with said gear and is connected to said cantilever, and a outer ring of which is connected to the lower end surface of said bending framework; thus said cantilever can be rotated through the inner tooth ring of said rotary support engaging with the gear.

7. The containers/vehicles inspection system with adjustable radiation X-ray angle according to claim 1, wherein, said pitching regulation mechanism is composed of:
- a second driving device;
- a worm connected to said second driving device;
- a worm wheel engaged with said worm; and
- an accelerator support rack connected with a rotary shaft of said worm wheel, on which the second driving device is provided, for supporting the second handwheel and realizing the change in sector elevation angle of main X-ray beam produced by said accelerator through the worm and worm wheel set.

8. The containers/vehicles inspection system with adjustable radiation X-ray angle according to any one of claim 1, wherein, a detector arm rack equipped with detectors and the second collimator is provided in said inspection passage; the X-ray produced by the accelerator is right opposite to the calibrator and the first collimator both which are arranged in order, and said first collimator is right opposite to said second collimator, so that the conical X-ray produced by said accelerator, after regulated into a sector shape, passes through the articles to be inspected and then is received by the detectors in the detector arm rack.

9. The containers/vehicles inspection system with adjustable radiation X-ray angle according claim 8, wherein, said detector arm rack is in the mode of a bending beam or a combination mode of horizontal beam with vertical beam.

10. The containers/vehicles inspection system with adjustable radiation X-ray angle according claim 8, wherein, a detector arm rack equipped with the detectors and the second collimator is provided in said inspection passage; the X-ray produced by the accelerator is right opposite to the calibrator and the first collimator both which are arranged in order, and said first collimator is right opposite to said second collimator, so that the conical X-ray produced by said accelerator, after regulated into a sector shape, passes through the articles to be inspected and then is received by the detectors in the detector arm rack.

* * * * *